US012382214B2

(12) United States Patent
Lin

(10) Patent No.: US 12,382,214 B2
(45) Date of Patent: Aug. 5, 2025

(54) AUDIO DEVICE FOR GENERATING LOW-FREQUENCY SOUND THROUGH LINKAGE OUTPUT WITH A FIXED CARRIER

(71) Applicant: Minghong Lin, Shenzhen (CN)

(72) Inventor: Minghong Lin, Shenzhen (CN)

( * ) Notice: Subject to any disclaimer, the term of this patent is extended or adjusted under 35 U.S.C. 154(b) by 181 days.

(21) Appl. No.: 18/470,707

(22) Filed: Sep. 20, 2023

(65) Prior Publication Data

US 2025/0097631 A1 Mar. 20, 2025

(51) Int. Cl.
*H04R 1/02* (2006.01)
*H04R 1/28* (2006.01)

(52) U.S. Cl.
CPC .......... *H04R 1/2811* (2013.01); *H04R 1/025* (2013.01)

(58) Field of Classification Search
CPC .............................. H04R 1/2811; H04R 1/025
USPC .................................................. 381/332, 334
See application file for complete search history.

(56) References Cited

FOREIGN PATENT DOCUMENTS

CN 218550081 U * 2/2023

* cited by examiner

*Primary Examiner* — Ammar T Hamid

(57) ABSTRACT

This invention presents audio device that generates low-frequency sound through a fixed carrier linkage, featuring a housing with a circuit board and an attached linear motor. Inside the housing, a fixed surface with a connection structure for hard surfaces is present. The linear motor vibrates perpendicular to this fixed surface, receiving low-frequency signals from the circuit board, generating vibrations transmitted to the hard surface through the connection structure, resulting in resonance vibrations and low-frequency sound in the air.

By utilizing a linear motor for low-frequency signal generation, this innovation achieves a compact size with substantial power output. Furthermore, the fixed connection between the housing and hard surface enhances vibration transmission, yielding even greater power output. This technology has versatile applications, including MINI speakers, mobile gaming feedback, resonating speakers, and similar products.

9 Claims, 3 Drawing Sheets

AUDIO DEVICE FOR GENERATING LOW-FREQUENCY SOUND THROUGH LINKAGE OUTPUT WITH A FIXED CARRIER

TECHNICAL FIELD

The present invention relates to an audio device, more specifically, a device for generating low-frequency sound through linked output with a fixed carrier.

BACKGROUND

Low-frequency output, also known as bass output, imposes certain crucial structural requirements in the design of audio equipment to ensure good sound quality and performance. The following are some key requirements:

Acoustic Cavity Design: The output of low-frequency sound requires a sufficiently large space, typically necessitating an appropriate acoustic cavity to accommodate low-frequency oscillations. The size, shape, and material selection of the cavity all influence the performance of low-frequency sound.

Diaphragm and Driver Unit: The diaphragm of low-frequency units, such as subwoofers or bass speakers, needs to be sufficiently large and capable of rapid vibration to produce the desired bass effect. Material selection, diaphragm structure, and driver unit design all impact the clarity and response of low-frequency sound.

Sealing: For low-frequency output, sealing is of paramount importance. Proper sealing design can reduce sound leakage, ensuring the concentration and enhancement of low-frequency sound. Typically, features like nesting and sealing strips are used at the junctions of the enclosure to achieve it.

Ventilation and Heat Dissipation: During low-frequency output, the driver unit generates a certain amount of heat. Therefore, ventilation and heat dissipation need to be considered in the design to prevent overheating and damage to the equipment.

Reflection and Diffraction: Good reflection and diffraction design can optimize the distribution and diffusion of low-frequency sound, ensuring that listeners in different positions experience uniform bass effects.

In summary, the output of low-frequency or bass sound occupies a certain amount of space in the design of audio equipment, which poses significant limitations for speaker products in terms of low-frequency sound.

Therefore, the inventor believes it is necessary to develop a new audio device that can output low-frequency sound even in a compact form factor while enhancing its low-frequency output to achieve superior bass audio performance and vibration feedback.

SUMMARY

The purpose of this invention is to address the above-mentioned issues in the existing technology by providing an audio device capable of outputting low-frequency sound through linked operation with a fixed carrier.

The objectives of this invention are achieved through the following technical solutions: An audio device for generating low-frequency sound through linked output with a fixed carrier, comprising:

An enclosure.

A circuit board positioned within the enclosure.

A linear motor located within the enclosure and connected to the circuit board.

The enclosure includes a fixed surface with a fixed connecting structure designed to attach to a rigid carrier.

The vibration direction of the linear motor is perpendicular to the fixed surface.

The circuit board outputs low-frequency signals to the linear motor, and the vibrations generated by the linear motor are transmitted through the fixed connecting structure to the rigid carrier, creating resonance and further inducing air vibration to output low-frequency signals.

Further technical solutions include:

The inclusion of a speaker and a battery board connected to the circuit board.

The vibration direction of the speaker is parallel to the fixed surface.

Two speakers are employed, along with two linear motors.

The fixed connecting structure can be suction cups, magnetic connectors, or double-sided adhesive tape.

The enclosure is square-shaped, with the circuit board and battery board positioned perpendicular to the fixed surface.

The enclosure has removable connectable covers on the sides that are perpendicular to the fixed surface.

The fixed connecting structure can consist of several suction cups.

The linear motor includes a housing with a hollow cavity, an electromagnetic coil within the housing, a vibrating shaft passing through the hollow cavity, and spring blades located at both ends of the hollow cavity.

The housing and speaker are both square-shaped.

Compared to the existing technology, the advantageous effects of this invention include:

The use of a linear motor as the driving element for low-frequency signals allows for a compact size while achieving high output power.

The fixed connection between the enclosure and the rigid carrier allows for the transmission of vibrations from the linear motor to the rigid carrier, resulting in increased power output.

This invention can be widely applied in products such as small MINI speakers, tactile feedback for gaming and mobile devices, and resonant speakers.

The use of a square-shaped enclosure and linear motor simplifies production and installation, and the use of suction cups as the fixed connecting structure allows for quick attachment to rigid carriers, such as desktops or the casings of electronic devices.

| | |
|---|---|
| 10 - Enclosure | 100 - Fixed surface |
| 101 - Enclosure cover | 103 - Side with through holes |

-continued

| | |
|---|---|
| 109 - Ventilation holes. | 20 - Circuit board |
| 21 - Speaker | 22 - Battery board |
| 30 - Linear motor. | 300 - Hollow cavity |
| 31 - Housing | 32 - Vibration shaft |
| 33 - Spring blades. | 50 - Suction cups |

DETAILED DESCRIPTION OF THE EMBODIMENTS

To provide a more comprehensive understanding of the technical content of this invention, specific embodiments are described as below. However, these embodiments are not limiting.

Figure 1:
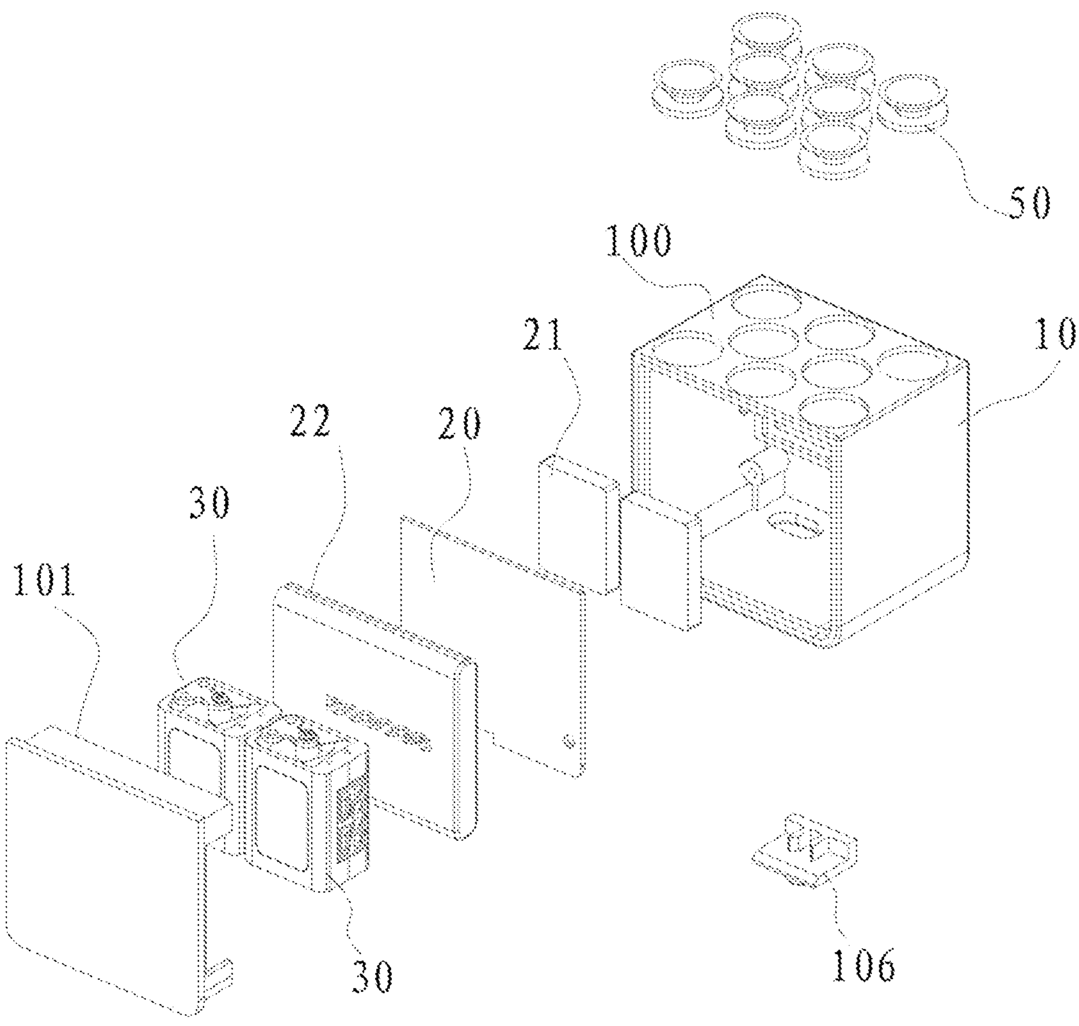
FIG. 1: Stereoscopic schematic diagram of a specific embodiment of the audio device for generating low-frequency sound through linked operation with a fixed carrier in the present invention.
Figure 2:
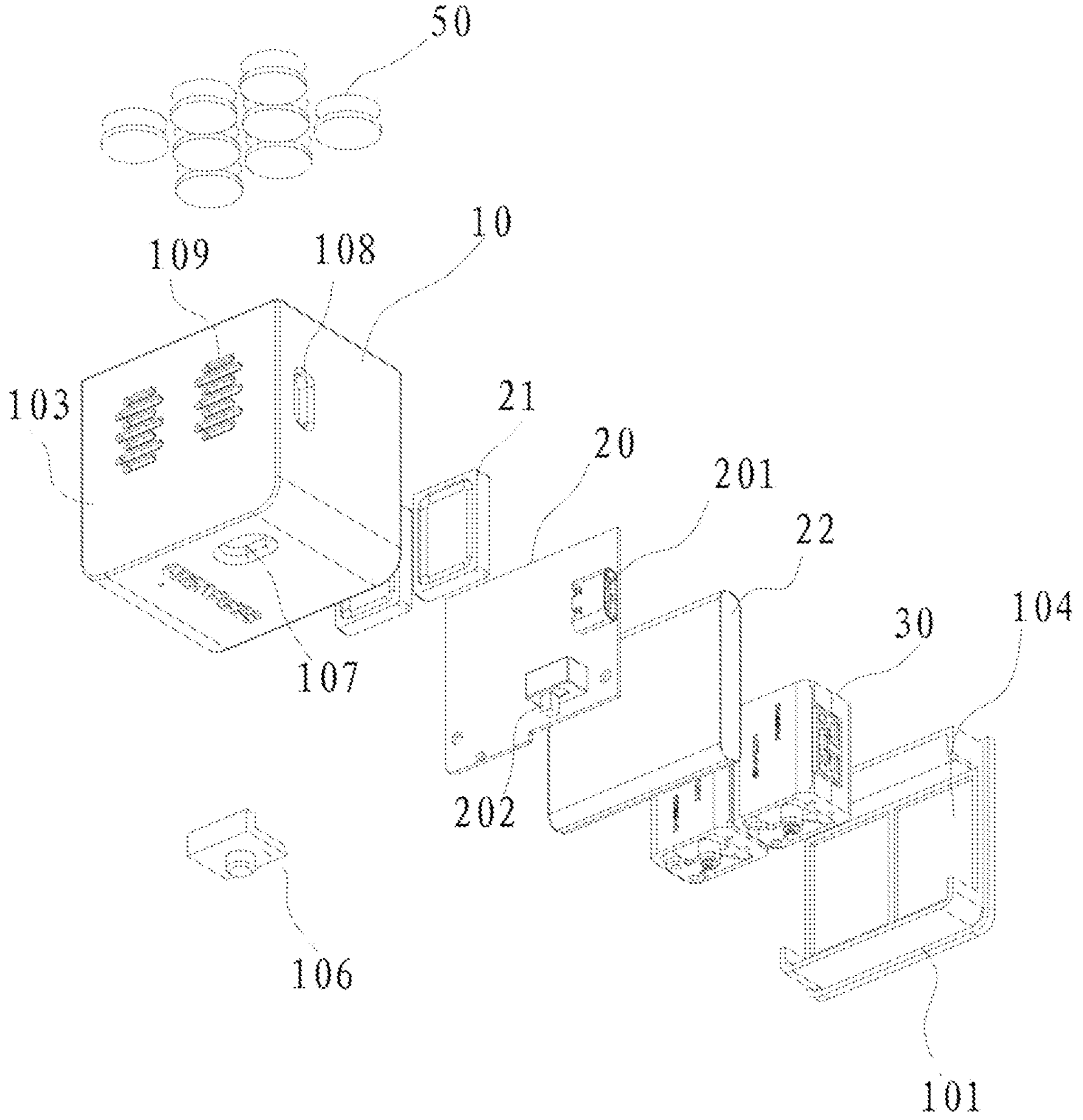
FIG. 2: The reverse stereoscopic schematic diagram of FIG. 1.
Figure 3:
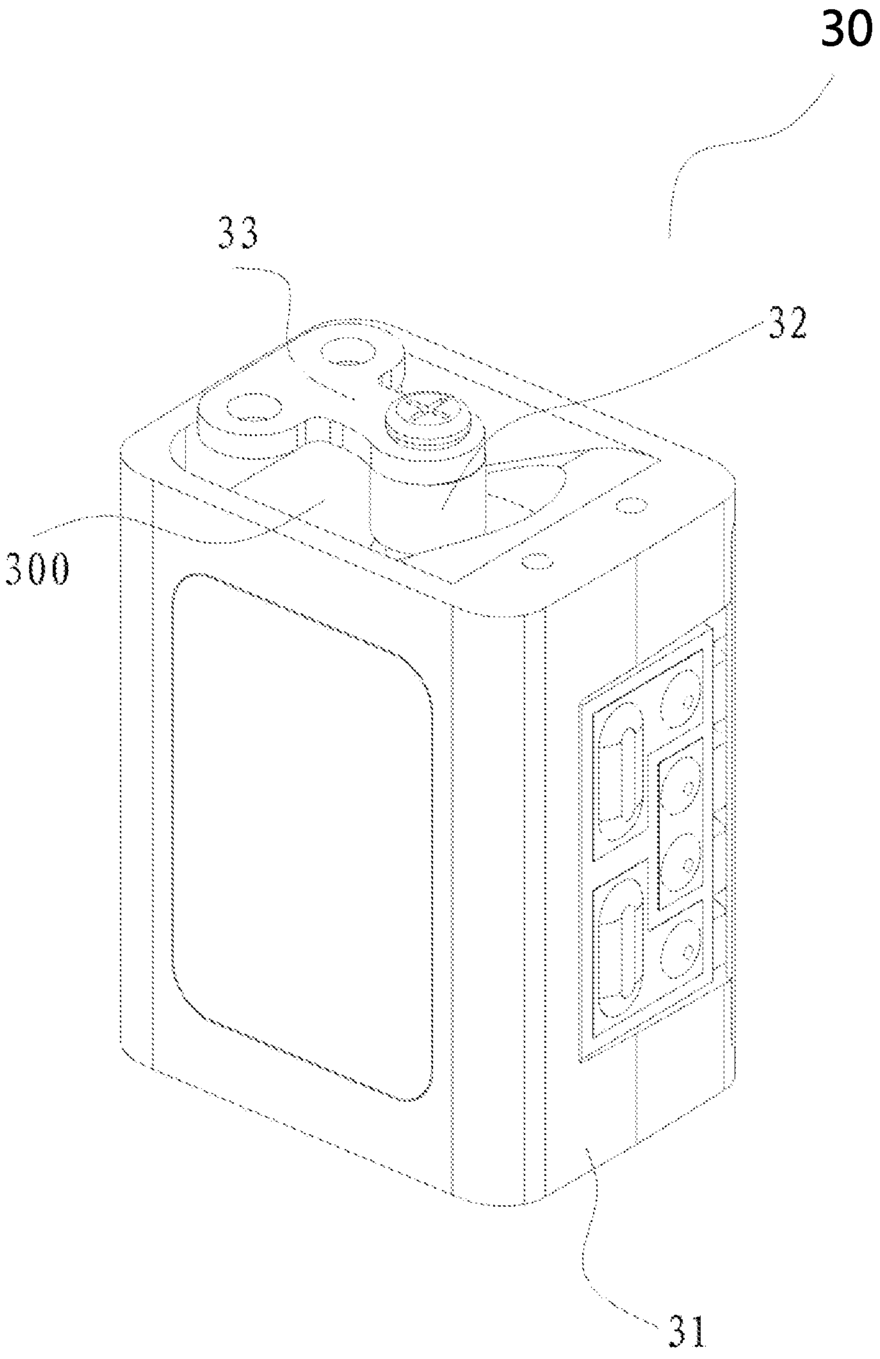
FIG. 3: Stereoscopic diagram of the linear motor in the embodiment of FIG. 1.

As shown in FIGS. 1 and 2, in a specific embodiment of the present invention, an audio device for generating low-frequency sound through linked operation with a fixed carrier comprises the following components:

Enclosure 10

Circuit board 20 positioned within enclosure 10

Linear motor 30 located within enclosure 10 and connected to circuit board 20

Enclosure 10 includes a fixed surface 100 with a fixed connecting structure designed to attach to a rigid carrier, and the vibration direction of linear motor 30 is perpendicular to fixed surface 100.

Circuit board 20 outputs low-frequency signals to linear motor 30, and the vibrations generated by linear motor 30 are transmitted through the fixed connecting structure to the rigid carrier, creating resonance and inducing air vibration to output low-frequency signals.

More specifically, it includes the following details:

A speaker 21 and a battery board 22 connected to circuit board 20. The speaker 21 is used to output audio signals above 300 Hz, while the battery board 22 provides portable power for ease of mobility.

The vibration direction of speaker 21 is parallel to fixed surface 100, allowing for the output direction of audio signals above 300 Hz to be perpendicular to the low-frequency signal output direction, which aids in creating a three-dimensional audio effect.

There are two speakers 21 and two linear motors 30 to enhance audio performance.

The enclosure 10 is square-shaped for ease of production and installation. The circuit board 20 and battery board 22 are positioned perpendicular to fixed surface 100, reducing interference with low-frequency signals.

Enclosure 10 has removable connectable covers 101 on the sides perpendicular to fixed surface 100, making it easy to disassemble for maintenance.

The fixed connecting structure consists of several suction cups 50, providing sufficient adhesion.

The linear motor 30 includes a housing 31 with a hollow cavity 300, an electromagnetic coil (not shown in the drawing) within the housing, a vibration shaft 32 passing through the hollow cavity 300, and spring blades 33 located at both ends of the hollow cavity 300.

The housing 31 and speaker 21 are both square-shaped for ease of production, installation, and maintenance.

On the sides of enclosure 10 corresponding to enclosure covers 101, there are through-hole sides 103 with several ventilation holes 109 to allow the sound generated by speaker 21 to pass through. Circuit board 20 has a charging port 201, a switch 202, and enclosure 10 has a charging hole 108 for passing through charging port 201. Switch key 106 is connected to switch 202, and the action of switch key 106 can trigger changes in switch 202.

Linear motor 30, battery board 22, circuit board 20, and speaker 21 are arranged from enclosure cover 101 to through-hole side 103 in sequence, with battery board 22 and circuit board 20 separating the low-frequency sound and high-frequency sound outputs, preventing interference.

The inside of enclosure cover 101 has a fixed chamber 104 for securing linear motor 30 and providing space for vibration shafts at both ends.

The fixed connecting structure can also be magnetic connectors, double-sided adhesive tape, screws, or other structures, the suction cups can be made of materials such as rubber, silicone, polyurethane, or polystyrene and have a circular shape for optimal performance.

In summary, the present invention utilizes a linear motor as the driving component for low-frequency signals, enabling high power output within a compact size. Furthermore, by securely connecting the enclosure to a rigid carrier, the vibrations of the linear motor are transmitted to the rigid carrier, resulting in increased power output. This technology can be widely applied in small MINI speakers, tactile feedback for gaming and mobile devices, resonant speakers, and similar products. The use of square-shaped enclosures and linear motors facilitates production and installation, while the use of suction cups as the fixed connecting structure allows for quick attachment of the enclosure to rigid carriers, such as desktops or the casings of electronic devices.

The above description serves to further explain the technical content of the present invention for better understanding. However, it does not imply that the implementation of the present invention is limited to these specific embodiments. Any technical extensions or innovations based on the present invention are also protected by the present invention. The scope of protection of this invention is determined by the claims.

The invention claimed is:

1. The audio device for generating low-frequency sound through linkage Output with a fixed carrier, comprising a housing, a circuit board located inside the housing, characterized in that a linear motor connected to the circuit board is also provided inside the housing; the housing has a fixed surface with a fixed connection structure for attachment to a hard carrier, and the vibration direction of the linear motor is perpendicular to the fixed surface; the circuit board outputs low-frequency signals to the linear motor, and the vibrations generated by the linear motor are transmitted to the hard carrier via the fixed connection structure, creating resonance vibrations and further causing air vibrations to output low-frequency signals.

2. The audio device for generating low-frequency sound through linkage Output with a fixed carrier what is claimed is 1, further comprising a speaker and a battery board connote the circuit board.

3. The audio device for generating low-frequency sound through linkage Output with a fixed carrier what is claimed is 2, wherein the vibration direction of the speaker is parallel to the fixed surface.

4. The audio device for generating low-frequency sound through linkage Output with a fixed carrier what is claimed is 1, wherein there are two speakers and two linear motors.

5. The audio device for generating low-frequency sound through linkage Output with a fixed carrier what is claimed is 1, wherein the fixed connection structure is a suction cup, a magnetic connector, or double-sided adhesive tape.

6. The audio device for generating low-frequency sound through linkage Output with a fixed carrier what is claimed is 1, wherein the housing is square-shaped, and the circuit board and battery board are perpendicular to the fixed surface.

7. The audio device for generating low-frequency sound through linkage Output with a fixed carrier what is claimed is 6, wherein the housing has a detachable cover on a side perpendicular to the fixed surface.

8. The audio device for generating low-frequency sound through linkage Output with a fixed carrier what is claimed is 7, wherein the fixed connection structure consists of several suction cups.

9. The audio device for generating low-frequency sound through linkage Output with a fixed carrier what is claimed is 2, wherein the linear motor includes a housing with a hollow cavity, an electromagnetic coil inside the housing, a vibration shaft passing through the hollow cavity, and tabs located at both ends of the hollow cavity.

* * * * *